United States Patent
Sarfraz et al.

(10) Patent No.: US 10,282,540 B2
(45) Date of Patent: May 7, 2019

(54) SECURING SOURCE DEVICES USING A DISPLAY DEVICE FILTER

(71) Applicant: Wyse Technology L.L.C., Santa Clara, CA (US)

(72) Inventors: Mohammed Sarfraz, Bangalore (IN); Jenin JohnSimon, Bangalore (IN)

(73) Assignee: WYSE TECHNOLOGY L.L.C., Santa Clara, CA (US)

( * ) Notice: Subject to any disclaimer, the term of this patent is extended or adjusted under 35 U.S.C. 154(b) by 116 days.

(21) Appl. No.: 15/488,709

(22) Filed: Apr. 17, 2017

(65) Prior Publication Data

US 2018/0300469 A1    Oct. 18, 2018

(51) Int. Cl.
*G06F 21/44*    (2013.01)
*G06F 21/55*    (2013.01)
*G06F 9/4401*   (2018.01)
*G06F 21/84*    (2013.01)

(52) U.S. Cl.
CPC .............. *G06F 21/44* (2013.01); *G06F 9/442* (2013.01); *G06F 21/554* (2013.01); *G06F 21/84* (2013.01); *G06F 2221/032* (2013.01)

(58) Field of Classification Search
CPC ........ G06F 21/44; G06F 9/442; G06F 21/554; G06F 21/83; G06F 2221/032
See application file for complete search history.

(56) References Cited

U.S. PATENT DOCUMENTS

| | | | | |
|---|---|---|---|---|
| 6,263,440 B1* | 7/2001 | Pruett | ................... | G06F 11/006 340/3.31 |
| 2006/0132473 A1* | 6/2006 | Fuller | ................... | G06F 3/1438 345/204 |
| 2008/0165202 A1* | 7/2008 | Brodersen | .......... | H04N 21/4122 345/581 |
| 2012/0093478 A1* | 4/2012 | Gallup | ................... | H04N 5/765 386/230 |
| 2013/0067534 A1* | 3/2013 | Soffer | ................... | G06F 3/0227 726/2 |
| 2017/0229093 A1* | 8/2017 | Sivertsen | ................ | G09G 5/006 |
| 2017/0238051 A1* | 8/2017 | Park | .................. | H04N 21/43635 348/730 |
| 2017/0245003 A1* | 8/2017 | Lee | ....................... | H04N 21/436 |

OTHER PUBLICATIONS

Miseli,DisplayTechnologyVESAandEDID,SunMicrosystems,Xorg DevelopersConference,Feb. 2007 (Year: 2007).*
Davis,HackingDisplays,NGSSecureResearchPublication,Mar. 2012 (Year: 2012).*

* cited by examiner

*Primary Examiner* — Luu T Pham
*Assistant Examiner* — Harvey I Cohen
(74) *Attorney, Agent, or Firm* — Kirton McConkie; Brian Tucker

(57) ABSTRACT

Source devices can be secured using a display device filter. When a display device is connected to a source device, a display device filter can identify the display device and determine whether it is a trusted display device. If the display device filter determines that the display device is not trusted, it can take a number of actions to minimize the likelihood of harm to the source device. These actions may include preventing the source device from booting, shutting down the source device, locking the source device, blocking access to other devices, and/or notifying an administrator. In this way, a malicious user can be prevented from gaining access to the source device.

19 Claims, 8 Drawing Sheets

SECURING SOURCE DEVICES USING A DISPLAY DEVICE FILTER

CROSS-REFERENCE TO RELATED APPLICATIONS

N/A

BACKGROUND

When a display device (e.g., a monitor, television, projector, etc) is connected to a source device (e.g., a computer that includes a graphics card, a cable or satellite television set top box, a Blue-ray player, a gaming console, etc.), the display device typically sends Extended Display Identification Data (EDID) to the source device. This EDID can include a number of different types of data such as product identifiers (e.g., a manufacturer ID, a product ID code, a serial number, etc.), basic display parameters (e.g., video input type, horizontal and vertical size, display gamma, etc.), color space definition, timing information, etc. The source device can employ the EDID to customize the display data it will output to the display device.

A number of different interfaces can be employed to connect a display device to a source device. These interfaces include High Definition Multimedia Interface (HDMI), Display Port (DP), Mobile High-Definition Link (MHL), and Digital Visual Interface (DVI) among others. EDID (as well as any enhanced EDID (E-EDID)) can be communicated over any of these interfaces using what is known as the Display Data Channel (DDC) standard. In essence, the DDC defines how to enable plug-and-play-like functionality for display devices.

Although the implementation of these protocols/standards has simplified the process of connecting a display device to a source device, it has also created a number of vulnerabilities to the source device. For example, it is becoming more common to place source devices in public places (e.g., IoT gateways). If someone has physical access to the source device, it is possible to connect a display device, access a logon screen via the display device, and then perform a brute force attack to gain access to the source device including any sensitive information that may be stored on the source device.

Also, many display devices may include an operating system that has wired or wireless network capabilities (e.g., smart televisions). If a user connects a source device to a display device with such capabilities, it is possible that the source device could be improperly accessed via a network to which the display device is connected (e.g., when the source device is connected to the display device via an HDMI Ethernet channel).

Further, malware could be injected (whether maliciously or unintentionally) into a display device's firmware or operating system. In such a case, once the display device is connected to a source device, the malware would gain access to the source device and possibly copy sensitive information to the display device's storage where it would become easily accessible to a malicious user.

Finally, the EDID itself can be a point of vulnerability. For example, a display device could be configured to report EDID that will cause an application to crash or a buffer overflow on the source device. In short, as it becomes more common to locate source devices where they are physically accessible and to provide display devices with networking capabilities, it will also become more common for source devices to be maliciously accessed via display devices.

BRIEF SUMMARY

The present invention extends to methods, systems, and computer program products for securing source devices using a display device filter. When a display device is connected to a source device, a display device filter can identify the display device and determine whether it is a trusted display device. If the display device filter determines that the display device is not trusted, it can take a number of actions to minimize the likelihood of harm to the source device. These actions may include preventing the source device from booting, shutting down the source device, locking the source device, blocking access to other devices, and/or notifying an administrator. In this way, a malicious user can be prevented from gaining access to the source device.

In one embodiment, the present invention is implemented as a method for securing a source device when a display device is connected. A display device filter can detect that a display device has been connected to the source device. The display device filter can then retrieve an identifier of the display device and employ the retrieved identifier to determine whether the display device is trusted. When it is determined that the display device is not trusted, the display device filter performs one or more actions to prevent access to the source device.

In another embodiment, the present invention is implemented as computer storage media storing computer executable instructions which when executed by one or more processors implement a method for securing a source device. The method includes: retrieving, by a display device filter driver that is loaded on a display device driver stack, an identifier of a display device that has been connected to the source device; comparing the retrieved identifier to a list of identifiers of trusted display devices; determining that the retrieved identifier is not included in the list; identifying one or more actions to be performed when an untrusted display device is connected to the source device; and causing the one or more actions to be performed.

In another embodiment, the present invention is implemented as a method for securing a source device when an untrusted display device is connected to the source device. A display device filter retrieves an identifier from EDID of a display device that is connected to the source device. The display device filter then accesses one or more configuration files to determine whether the retrieved identifier is an identifier of a trusted display device. When it is determined that the retrieved identifier is not an identifier of a trusted display device, the display device filter accesses the one or more configuration files to identify one or more actions to be performed when an untrusted display device is connected to the source device. The display device filter can then cause the one or more actions to be performed on the source device.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
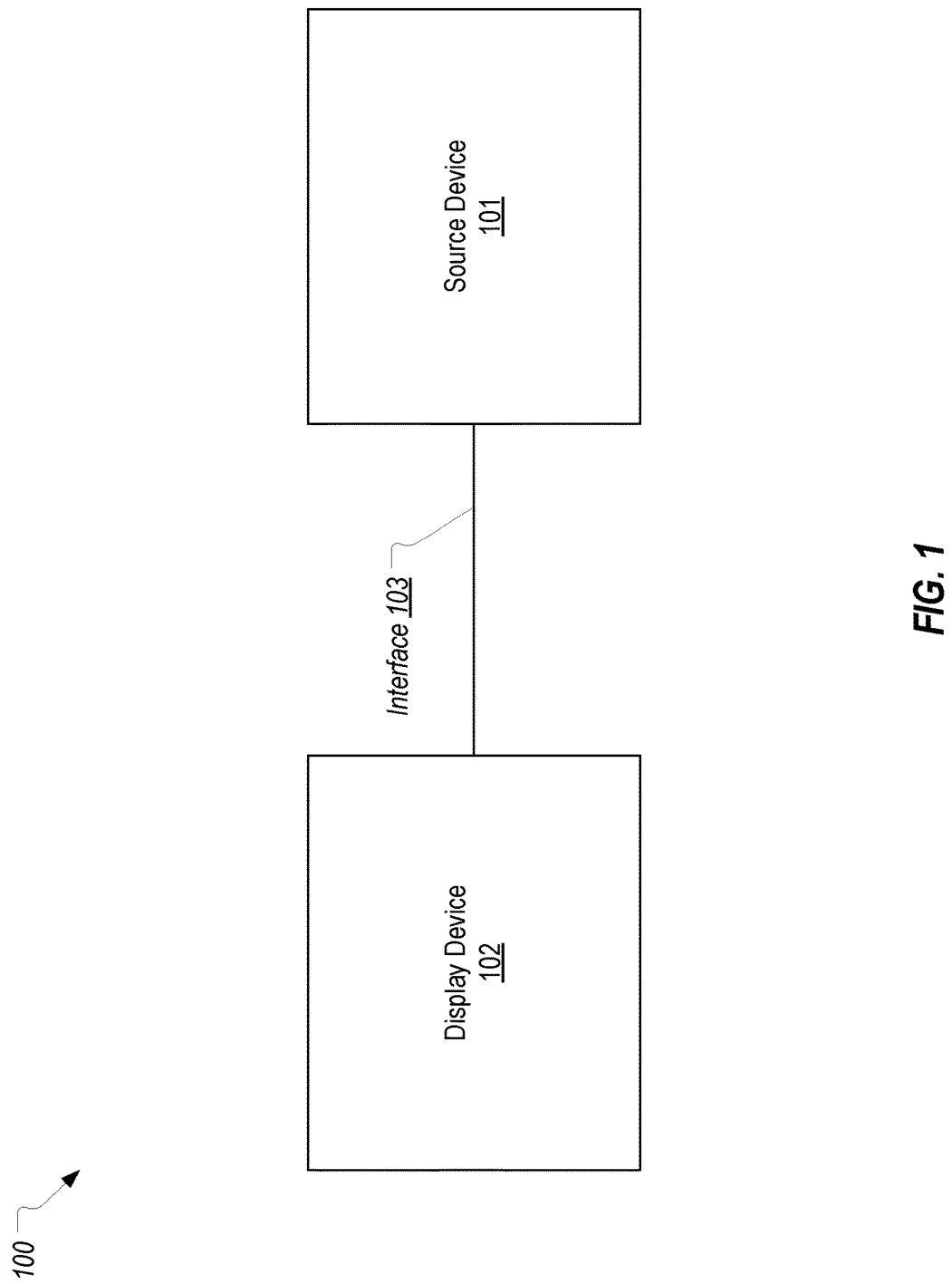
FIG. 1 illustrates an example computing environment in which the present invention can be implemented.

FIG. 1 illustrates an example computing environment 100 in which the present invention can be implemented. Computing environment 100 includes a source device 101 and a display device 102 that are interconnected via an interface 103. Source device 101 can represent any computing device to which a display device can be coupled for the purpose of outputting display data to the display device. Display device 102 can represent any device that can receive display data from source device 101 and display it. Interface 103 can represent any of the currently available or future display interfaces such as HDMI, DP, MHL, or DVI.

Figure 2:
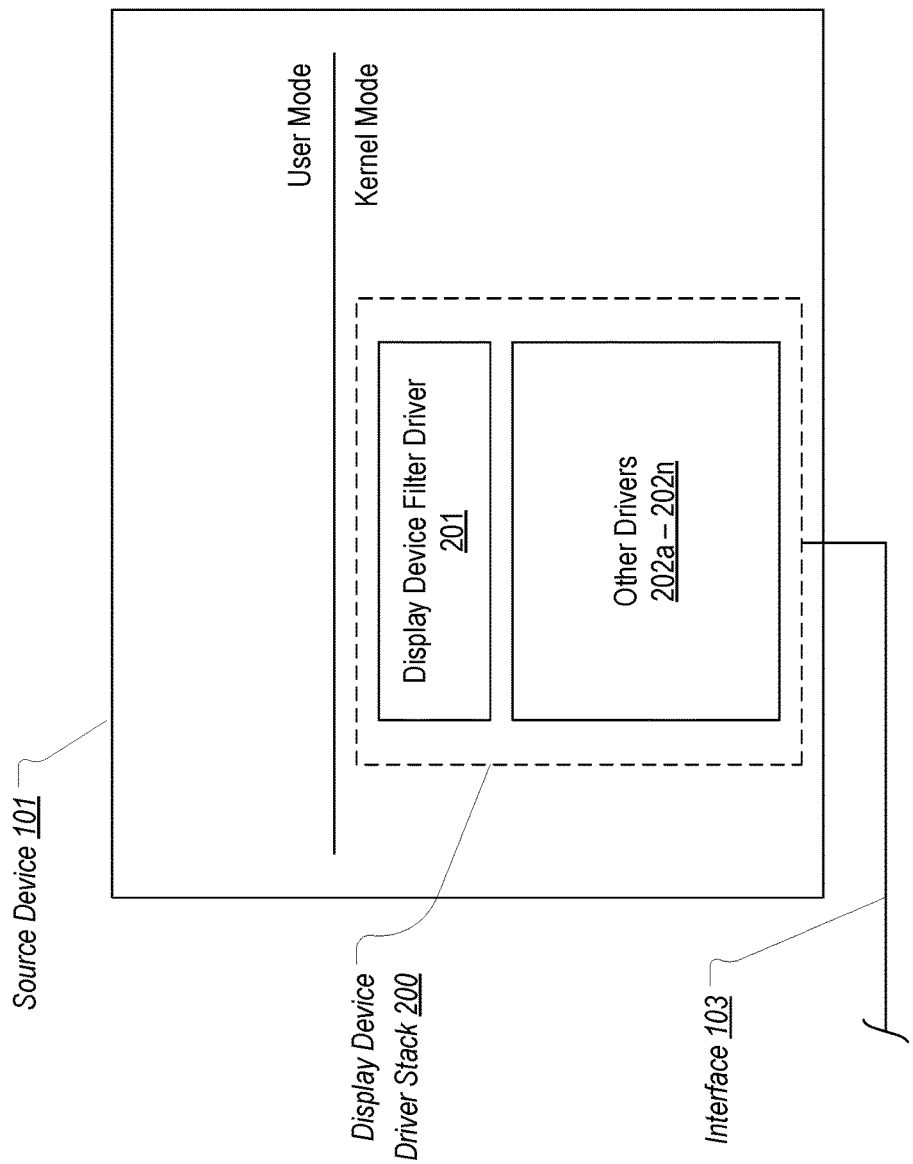
FIG. 2 illustrates how a display device filter driver can be loaded on the display device driver stack when a display device is connected to a source device.

FIG. 2 illustrates an example architecture of source device 101. Source device 101 is configured to load a display device driver stack 200 for a display adapter. The display adapter may support a number of display devices via a number of interfaces. As is known, the display adapter is loaded to manage each of its available video outputs (or "child devices" in Windows terminology) even if a display device is not connected to a video output. Display device driver stack 200 can include a number of drivers 202a-202n (where n represents any integer). For example, other drivers 202a-202n can include a display port driver, a display miniport driver, etc. The exact architecture of display device driver stack 200 is not essential to the invention. However, of importance to present invention is the fact that a display device filter driver 201 can be loaded on display device driver stack 200. In some embodiments, display device filter driver 201 can be registered with the operating system of source device 101 to be loaded onto display device driver stack 200 as a kernel mode upper-level filter driver.

Figure 3:
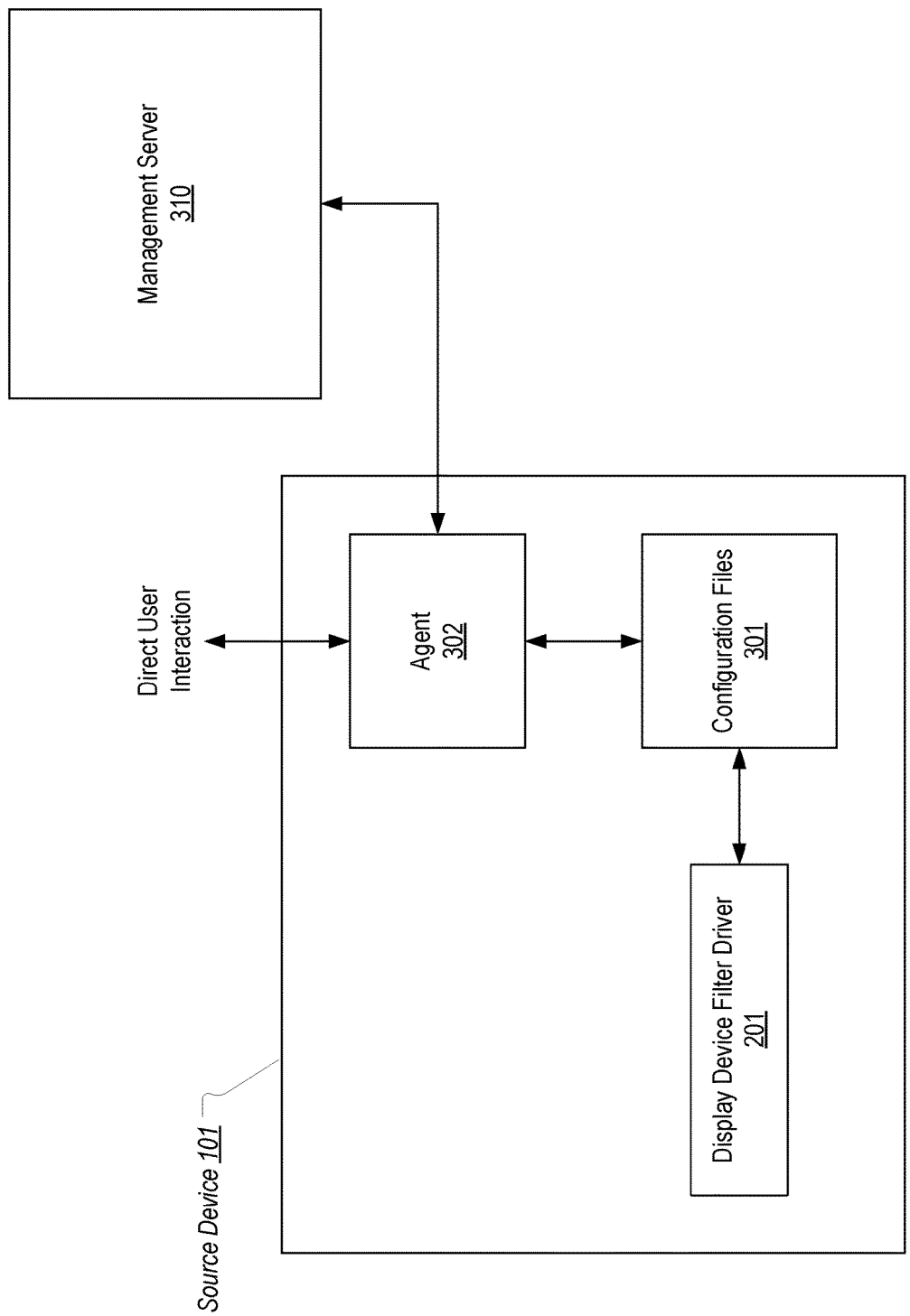
FIG. 3 illustrates how the display device filter driver can employ configuration files to determine whether a display device is trusted and what actions to take when a display device is untrusted and also illustrates how an agent can be employed as an interface for managing the configuration files.

By way of overview, display device filter driver 201 can be configured to detect when display device 102 (or any other display device) is connected, determine whether display device 102 is trusted and, if not, take appropriate action to prevent any harm to source device 101. FIG. 3 generally depicts the components that display device filter driver 201 can employ when making these determinations. As shown, display device filter driver 201 can be configured to access configuration files 301 which provide information regarding which display devices are trusted and which action(s) should be taken when an untrusted display device is connected. As is depicted, configuration files 301 (which may represent one or more files) can typically be located directly on source device 101 (e.g., at a known folder location). However, in some embodiments, display device filter driver 201 could be configured to interface with an external system for the purpose of accessing configuration files (e.g., by directly establishing a socket connection to a server or by employing a user mode agent to establish a socket connection). Therefore, the exact location of configuration files 301 and the exact manner in which display device filter driver 201 accesses configuration files 301 is not essential to the present invention. For ease of illustration, the remainder of the description will assume that configuration files 301 are stored locally on source device 101.

To allow configuration files 301 to be managed, an agent 302 may be executed on source device 101. Agent 302 could be a service that provides an avenue for creating, updating, and/or deleting configuration files 301. As shown, agent 302 can provide a user interface by which a user can directly manage configuration files (e.g., by logging in locally or remotely to source device 101). Alternatively or additionally, agent 302 may also provide a network interface by which configuration files 301 can be managed from a management server 310 (e.g., by listening for communications from management server 310 or by periodically polling management server 310). In such scenarios, management server 310 could be employed to manage (e.g., create, update, and/or delete) configuration files that are stored on (or employed by) a number of source devices.

As mentioned above, configuration files 301 can include two general types of information: (1) information that can be employed to determine whether a particular display device is trusted; and (2) information that defines what actions should be taken when an untrusted display device is connected to source device 101. By way of example, configuration files 301 could list an identifier or identifiers of any display device that is trusted (e.g., serial numbers of trusted display devices). Similarly, configuration files 301 could list/identify one or more actions to perform when a connected display device is determined to be untrusted. The following depicts an example of XML-formatted content that may be included in configuration files 301:

```
<DisplayDeviceFilter>
    <DisplayDevices>
        <Device serialnumber="U417N13S0AVL"></Device>
        <Device serialnumber="U417N14S0ADL"></Device>
        <Device serialnumber="U417N15S0ASL"></Device>
        <Device serialnumber="U417N16S0AQL"></Device>
    </DisplayDevices>
    <LockDownPolicies>
        <Policy name="ForceShutdown">        State="ON"></Policy>
        <Policy name="ForceReboot">          State="OFF"></Policy>
        <Policy name="BlockKeyboard">        State="OFF"></Policy>
        <Policy name="BlockMouse">           State="OFF"></Policy>
        <Policy name="BlockHIDDevices">      State="OFF"></Policy>
        <Policy name="BlockUSBDevices">      State="OFF"></Policy>
        <Policy name="LockoutScreen">        State="OFF"></Policy>
        <Policy name="TriggerKernelStopError"> State="OFF"></Policy>
        <Policy name="SendAlert">            State="OFF"></Policy>
    </LockDownPolicies>
</DisplayDeviceFilter>
```

In this example, the <DisplayDevices> element encapsulates <Device> elements each of which includes an identifier of a trusted device. By way of example only, the identifier is the serial number of the display device which could be retrieved as part of the EDID as will be further described below. It is important to note, however, that any other identifier or combination of identifiers could equally be employed. The <LockDownPolicies> element encapsulates <Policy> elements each of which defines an action and whether the action should be taken when an untrusted display device is connected. In this example, the only action that should be taken (i.e., the only action that is turned ON) is the ForceShutdown action. Therefore, if an untrusted device is connected, display device filter driver 201 will cause source device 101 to shut down. Any combination of one or more actions may be turned on. For example, it may be desirable to disable all modes of input (e.g., disable the keyboard, mouse, and HID interfaces) when an untrusted display device is connected which could be accomplished in this example by setting the state of the BlockKeyboard, BlockMouse, and BlockHIDDevices policy elements to ON. Any other format and/or structure of configuration files 301 may equally be employed.

FIGS. 4A-4D illustrate an example of the processing that display device filter driver 201 can perform when display device 102 is connected to source device 101. Display device 102 could be connected to source device 101 prior to source device 101 being booted or could be connected to source device 101 while source device 101 is already booted. In either case, as is known in the art, the operating system on source device 101 will implement an enumeration process in which the presence of display device 102 is determined and appropriate steps are taken to enable source device 101 to communicate with display device 102. This process may vary slightly depending on whether display device 102 is connected during the boot process or after source device 101 has already booted, but these variations are not important to the processing that display device filter driver 201 performs to determine whether display device 102 is trusted.

Figure 4A:
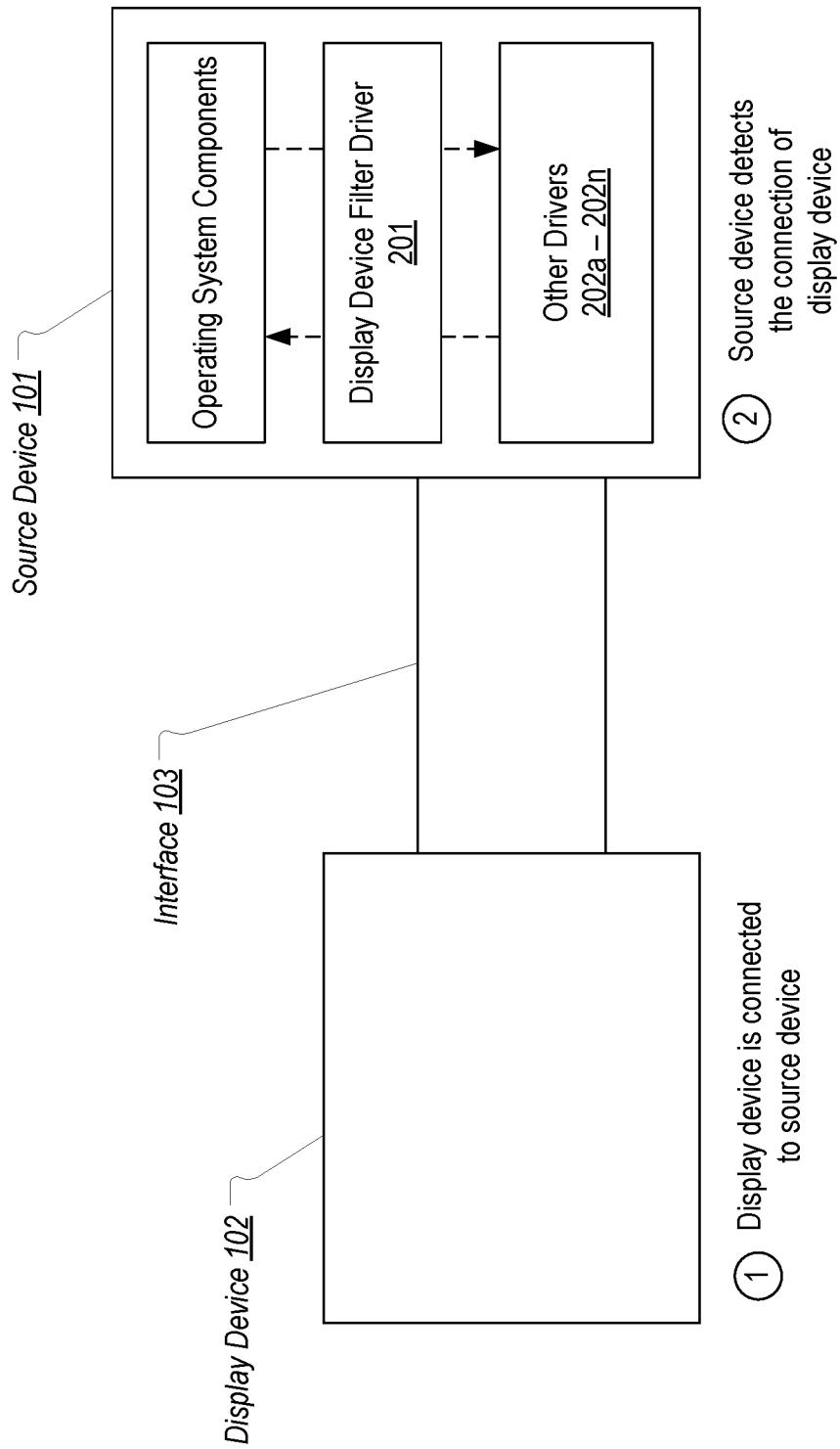
FIGS. 4A-4D illustrate an example sequence of steps that can be performed when a display device is connected to determine whether a display device is trusted.

In step 1 shown in FIG. 4A, it is assumed that display device 102 is connected to source device 101 via interface 103. As mentioned, step 1 could be performed either before or after source device 101 is booted. To exemplify a primary benefit of the present invention, it will also be assumed that a malicious user has connected display device 102. In step 2, the connection of display device 102 to one of the video outputs of source device 101 will be detected. As represented by the dashed lines, this detection (or enumeration) process includes the calling of a number of functions which will cause the lower level drivers (e.g., the display port driver, display miniport driver, and/or the VidPN manager) to report to the operating system that a display device has been connected to a particular video output. In a Windows environment, these functions can include the DxgkDdiQueryChildStatus and DxgkCbIndicateChildStatus functions. In the context of a hot plug event, these functions can result in the HotPlug.Connected member of a DXGK_CHILD_STATUS structure being set to true thereby indicating that a display device has been connected to a video output. It is noted, however, that the present invention should not be limited to Windows environments and other operating systems employ similar techniques for detecting when a display device has been connected. In any case, and as depicted in FIG. 4A, display device filter driver 201 can intercept these communications that report the connection of display device 102 thereby allowing display device filter driver 201 to determine that a display device has been connected (e.g., by identifying the video output whose DXGK_CHILD_STATUS structure has been updated to set the HotPlug.Connected member to True).

It is noted that display device filter driver 201 could be loaded as a filter driver at different levels in display device driver stack 200. For example, display device filter driver 201 could be configured to be loaded above the bus driver for the display adapter. In such cases, display device filter driver 201 would be loaded as part of initializing the display adapter (i.e., it would be loaded regardless of which display devices are connected). On the other hand, display device filter driver 201 could be configured as a filter driver that is loaded when a particular type of display device is connected and could therefore sit above the function driver provided for the particular display device (e.g., Monitor.sys in a Windows environment). In such cases, display device filter driver 201 would be loaded after the particular type of display device is connected and could employ the fact that it was loaded to determine that a display device has been connected (i.e., it may not need to monitor for specific function calls to detect when a display device has been connected).

Figure 4B:
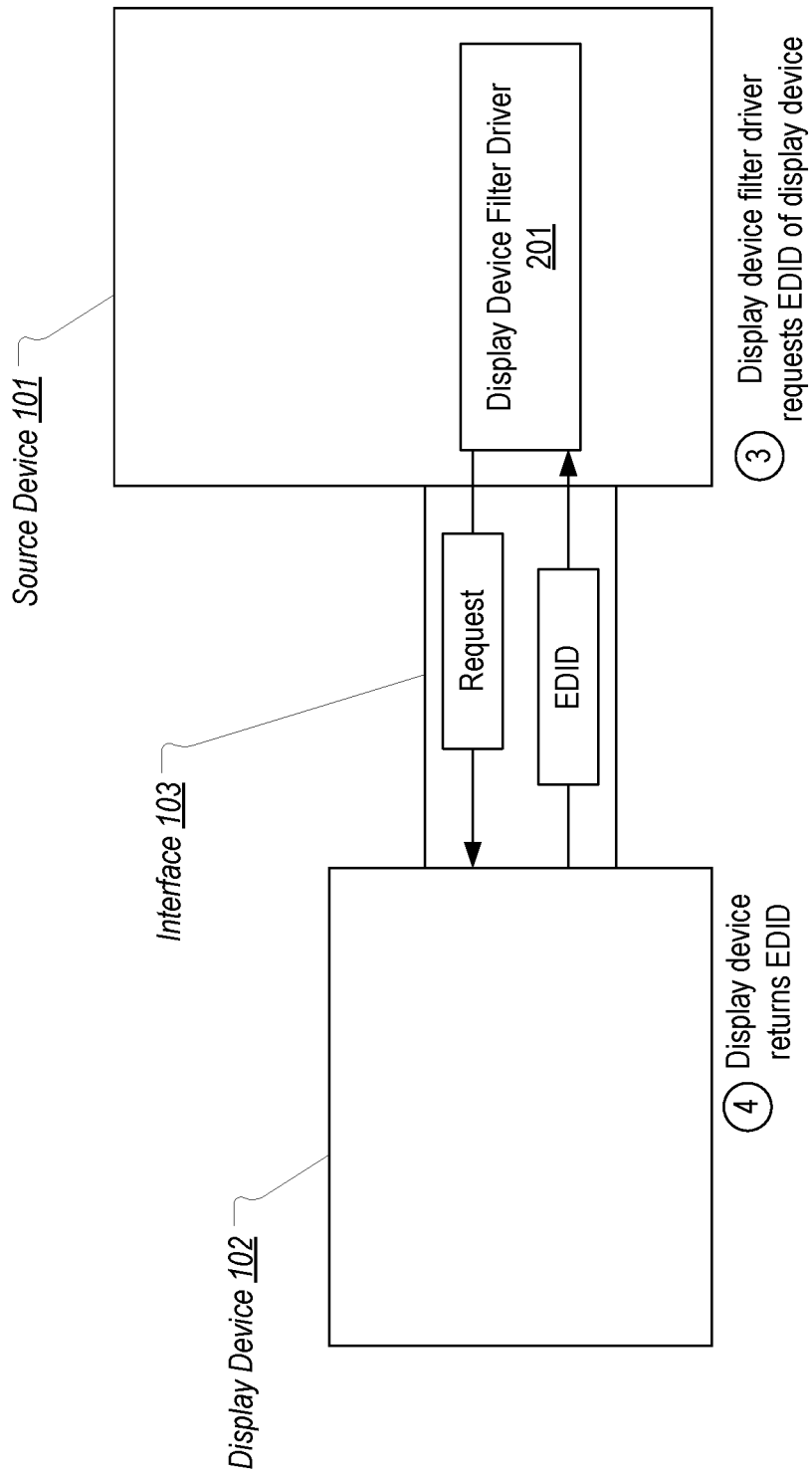

Turning to FIG. 4B, in response to detecting that display device 102 has been connected to a particular video output, display device filter driver 201 can send a request for the EDID of display device 102 in step 3. As an example, display device filter driver 201 could call a function provided by other drivers 202*a*-202*n* (e.g., by sending a request to the display port/miniport driver pair that is represented by the physical device object at the bottom of display device driver stack 200). The DDC protocol will typically be employed to convey this request to display device 102. In response, display device 102 will send back its EDID typically via the DDC protocol which will be routed up display device driver stack 200 to display device filter driver 201.

Figure 4C:
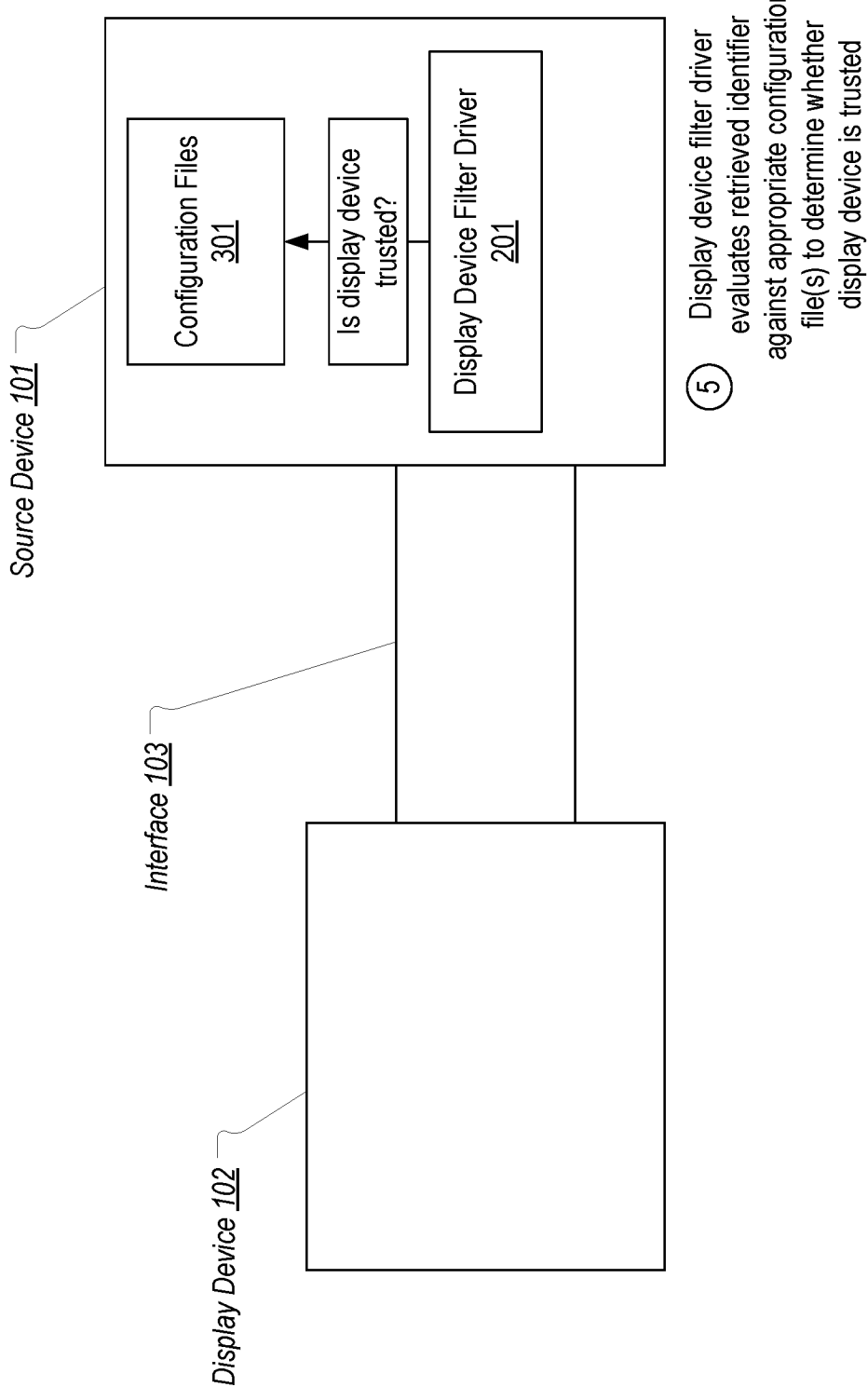
Figure 4D:
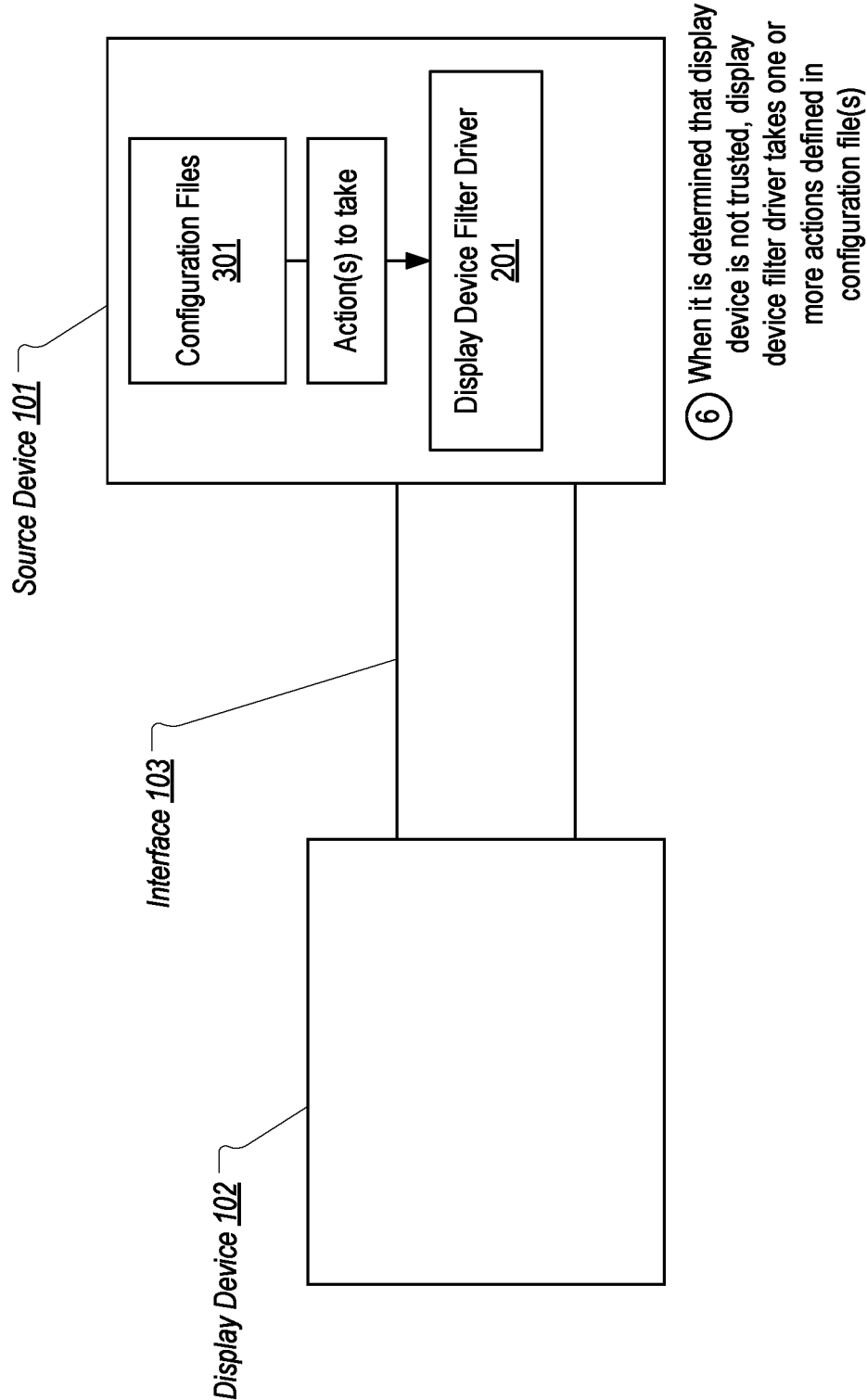

In step 5, as represented in FIG. 4C, display device filter driver 201 can employ an identifier from the received EDID to determine whether display device 102 is trusted. This is accomplished by accessing configuration files 301 to determine whether configuration files 301 indicate that display device 102 is trusted. With reference to the XML example above, display device filter driver 201 could obtain the serial number of display device 102 as defined in the EDID and then determine whether configuration files 301 include a device element with a matching serial number. Again, the serial number is only one example of an identifier that can be employed in this process and any other identifier or combination of identifiers that could uniquely identify a display device could be employed.

Based on the assumption that display device 102 has been connected by a malicious user, display device filter driver 201 should not find a matching serial number in configuration files 301 (unless the malicious user somehow obtained a trusted display device) and can therefore determine that display device 102 is not trusted. Therefore, in step 6 shown in FIG. 4D, display device filter driver 201 can determine which action(s) to perform and then perform them. With reference to the XML example above, display device filter driver 201 would determine that source device 101 should be shut down whenever an untrusted display device is connected and can therefore cause source device 101 to shut down. If configuration files 301 instead defined that source device 101 should not be shut down but that keyboard, mouse, and HID input should be blocked, display device filter driver 201 could take appropriate action to block such input on source device 101. By doing so, the malicious user may be able to view the user interface of source device 101 (e.g., a logon screen) but will be unable to provide any input.

In summary, display device filter driver 201 can be loaded on the display device driver stack where it can obtain the appropriate identifier(s) of a connected display device. Based on the identifier(s), display device filter driver 201 can access configuration files 301 to determine if the display device is trusted, and, if not, which actions to take to minimize any harm to source device 101.

The following discussion is intended to provide examples of how display device filter driver 201 can implement the specified action(s) when an untrusted display device is connected. In many cases, display device filter driver 201 may interface with a user mode service (which could be represented by agent 302) to implement these actions. For example, if configuration files 301 define that keyboard, mouse, and HID input should be blocked, display device filter driver 201 can request that the user mode service apply a group policy that specifies that the operating system should not load drivers pertaining to the keyboard, mouse, or HID USB device class (e.g., by enabling the appropriate settings and calling RefreshPolicy). In a Linux environment, one way to accomplish the disabling of an input device is by using the xinput command and setting "Device Enabled" to 0 for each available device. Similar techniques could be employed to disable all USB devices.

Rather than blocking the loading of drivers for input devices, input from such device could instead be blocked by installing a hook procedure to intercept mouse and keyboard events and prevent them from being handled in the normal fashion (e.g., block the input from reaching the window that has focus).

To force shutdown or reboot of source device 101, display device filter driver 201 can instruct a user mode application to call the InitiateShutdown function of the WINAPI with the dwshutdownFlags set to either SHUTDOWN_POWER-OFF or SHUTDOWN_RESTART. In Linux, the shutdown command could be used in a similar manner. A similar result can be accomplished when the TriggerKernelStopError action is set. In this case, the KeBugCheckEx function could be called to cause an immediate, controlled shutdown of source system 101.

Finally, when the SendAlert action is set, display device filter driver 201 can cause a user mode service to send an email or other communication to an administrator. This email could include information about source device 101 such as its name and IP address and can report that an untrusted display device was connected.

In the above description, display device filter driver 201 has performed the functionality for determining when a display device has been connected as well as determining whether a connected display device is trusted. In contrast, in some embodiments, a user mode service could be configured to operate with display device filter driver 201 to perform these functions. As an example, a user mode service could employ the WMIMonitorID command in the Windows PowerShell to retrieve an appropriate identifier of any connected display device (e.g., gwmi WmiMonitorID—Namespace root\wmi). In such cases, the user mode service could be configured to periodically invoke this command so as to quickly identify when a display device has been connected. A "display device filter" can be construed as encompassing embodiments where a user mode service and display device filter driver 201 are employed.

Figure 5:
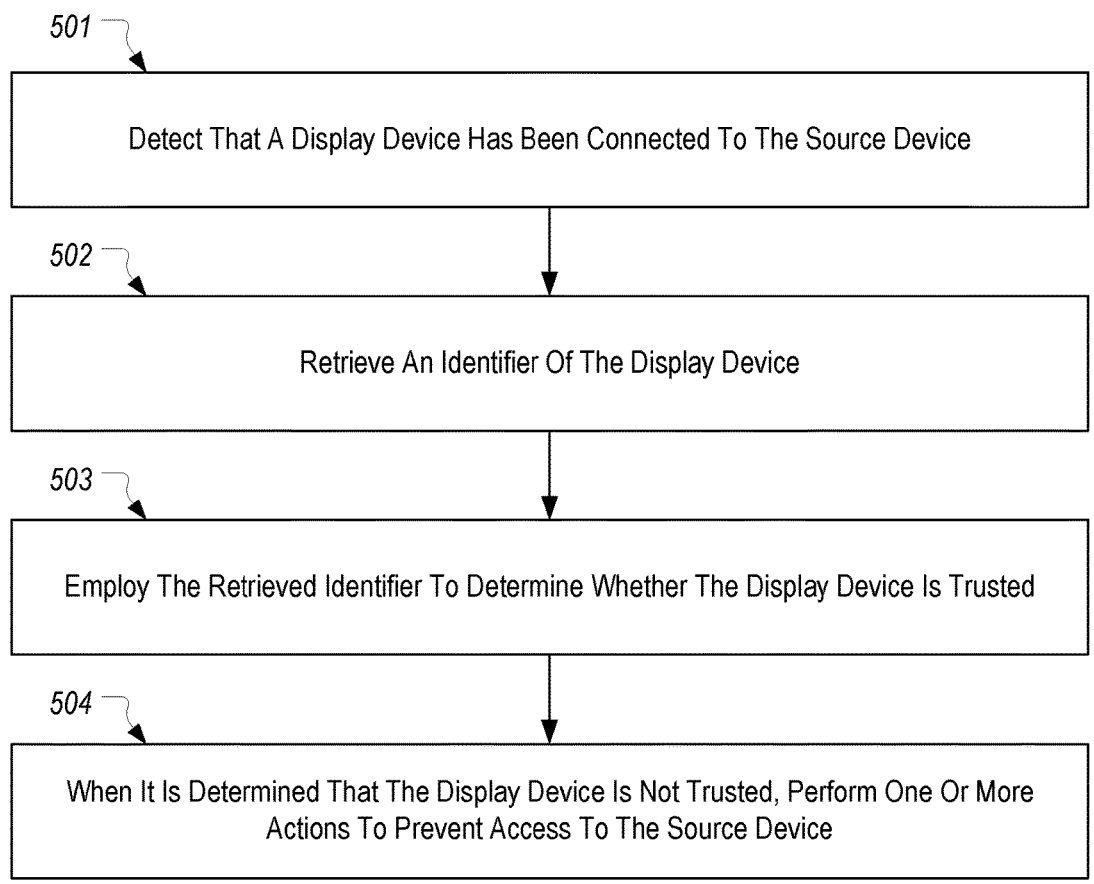
FIG. 5 illustrates a flowchart of an example method for securing a source device using a display device filter.

FIG. 5 provides a flowchart of an example method 500 for securing a source device when a display device is connected. Method 500 can be performed by a display device filter which may include display device filter driver 201 and/or a user mode service.

Method 500 includes an act 501 of detecting that a display device has been connected to the source device. For example, display device filter driver 201 could monitor for communications indicating that a display device has been connected. Alternatively, a user mode service could examine information about currently connected display devices to determine when a new display device has been connected.

Method 500 includes an act 502 of retrieving an identifier of the display device. For example, the display device filter could retrieve a serial number or other identifier from the EDID of the display device.

Method 500 includes an act 503 of employing the retrieved identifier to determine whether the display device is trusted. For example, the display device filter could access configuration files 301 to determine whether the retrieved identifier is an identifier of a trusted display device.

Method 500 includes an act 504 of, when it is determined that the display device is not trusted, performing one or more actions to prevent access to the source device. For example, the display device filter could cause source device 101 to be shut down or restarted, could cause a lock screen to be displayed on the connected display device, could disable input or other devices, or could notify an administrator.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for securing a source device when a display device is connected to the source device, the method comprising:
    detecting, by a display device filter that includes a display device filter driver that is loaded on a display device driver stack on the source device, that the display device has been connected to the source device by evaluating one or more communications that are passed within the display device driver stack, the one or more communications identifying that the display device has been connected to a particular video output of the source device;
    retrieving, by the display device filter, an identifier of the display device that is included in metadata that the display device provides to describe capabilities to the source device, the metadata conforming to the Extended Display Identification Data (EDID) standard or a subsequent standard that augments or replaces the EDID standard;
    accessing one or more configuration files to obtain a list of identifiers of trusted display devices;
    comparing, by the display device filter, the retrieved identifier to the list of identifiers to determine whether the display device is trusted; and
    performing, by the display device filter, one or more actions to prevent access to the source device when it is determined, based on the comparison, that the display device is not trusted.

2. The method of claim 1, wherein detecting that the display device has been connected to the source device comprises detecting that the display device is connected while the source device is booting.

3. The method of claim 1, wherein detecting that the display device has been connected to the source device comprises detecting that the display device has been connected after the source device has booted.

4. The method of claim 1, wherein the display device filter also comprises a user mode service that detects that the display device has been connected to the source device.

5. The method of claim 4, wherein the user mode service also compares the retrieved identifier to a list of identifiers to determine whether the display device is trusted.

6. The method of claim 1, wherein the display device filter driver detects that the display device has been connected to the source device by receiving the one or more communications as the one or more communications are passed within the display device driver stack.

7. The method of claim 1, wherein the identifier comprises a serial number of the display device.

8. The method of claim 1, wherein the list of identifiers of trusted display devices either:
    positively lists the identifiers of the trusted display devices such that the display device filter determines that the display device is trusted when the identifier of the display device is included in the list of identifiers; or
    positively lists identifiers of untrusted display devices such that the display device filter determines that the display device is the identifier of the display device is not included in the list of identifiers.

9. The method of claim 1, wherein the one or more configuration files are stored locally on the source device.

10. The method of claim 1, wherein the one or more actions comprises one or more of:
    disabling keyboard input;
    disabling mouse input;
    disabling human interface device (HID) input;
    restarting the source device;
    shutting down the source device;
    displaying a lockout screen on the display device;
    stopping a kernel of an operating system on the source device; or
    sending an alert to an administrator.

11. The method of claim 1, further comprising:
    receiving user input that updates the one or more configuration files.

12. The method of claim 11, wherein the user input is received from a management server.

13. One or more computer storage media storing computer executable instructions which when executed by one or more processors implement a method for securing a source device, the method comprising:
    detecting, by a display device filter driver that is loaded on a display device driver stack on a source device, that a display device has been connected to the source device by evaluating one or more communications that are passed within the display device driver stack, the one or more communications identifying that the display device has been connected to a particular video output of the source device;
    in response to detecting that the display device has been connected to the particular video output of the source device, sending one or more requests for Extended Display Identification Data (EDID) of the display device;
    in response to receiving the EDID of the display device, extracting an identifier of the display device from the EDED;
    comparing the identifier to a list of identifiers of trusted display devices;
    determining that the retrieved identifier is not included in the list;
    identifying one or more actions to be performed when an entrusted display device is connected to the source device; and
    causing the one or more actions to be performed to prevent access to the source device.

14. The computer storage media of claim 13, wherein evaluating one or more communications that are passed within the display device driver stack comprises evaluating one or more DXGK_CHILD_STATUS structures.

15. The computer storage media of claim 13, wherein the one or more actions include one or more of:
    disabling keyboard input;
    disabling mouse input;
    disabling human interface device (HID) input;
    restarting the source device;
    shutting down the source device;
    displaying a lockout screen on the display device;
    stopping a kernel of an operating system on the source device; or
    sending an alert to an administrator.

16. The computer storage media of claim 13, wherein the identifier comprises a serial number of the display device.

17. The computer storage media of claim 13, wherein sending one or more requests for EDID of the display device comprises calling a function provided by another driver loaded on the display device stack.

18. A method for securing a source device when an untrusted display device is connected to the source device, the method comprising:
- detecting, by a display device filter that includes a display device filter driver that is loaded on a display device driver stack on a source device, that a display device has been connected to the source device by evaluating one or more communications that are passed within the display device driver stack, the one or more communications identifying that the display device has been connected to a particular video output of the source device;
- retrieving, by the display device filter, an identifier from Extended Display Identification Data (EDID) of the display device;
- accessing, by the display device filter, one or more configuration files to determine whether the retrieved identifier is an identifier of a trusted display device;
- when it is determined that the retrieved identifier is not an identifier of a trusted display device, accessing, by the display device filter, the one or more configuration files to identify one or more actions to be performed when an untrusted display device is connected to the source device; and
- causing, by the display device filter, the one or more actions to be performed on the source device to prevent access to the source device.

19. The method of claim 18, wherein the display device filter also includes a user mode service.

* * * * *